(12) United States Patent
Okutani et al.

(10) Patent No.: US 7,727,671 B2
(45) Date of Patent: Jun. 1, 2010

(54) ELECTRODE TAB FOR SPIRAL WOUND BATTERY

(75) Inventors: Eiji Okutani, Itano-gun (JP); Atsushi Obayashi, Naruto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 318 days.

(21) Appl. No.: 10/386,713

(22) Filed: Mar. 13, 2003

(65) Prior Publication Data

US 2003/0175587 A1    Sep. 18, 2003

(30) Foreign Application Priority Data

Mar. 15, 2002   (JP)   ............................ 2002-073368

(51) Int. Cl.
*H01M 2/26*   (2006.01)
*H01M 2/04*   (2006.01)

(52) U.S. Cl. ..................... 429/211; 429/161; 429/178; 429/94

(58) Field of Classification Search ................ 429/208, 429/209, 211, 128, 163–171
See application file for complete search history.

(56) References Cited

U.S. PATENT DOCUMENTS

| | | | | |
|---|---|---|---|---|
| 5,006,426 A | * | 4/1991 | Suzuki et al. | 429/94 |
| 5,834,133 A | * | 11/1998 | Narukawa et al. | 429/171 |
| 6,187,472 B1 | * | 2/2001 | Shiota et al. | 429/127 |
| 6,241,790 B1 | * | 6/2001 | Matsubara et al. | 29/623.1 |

FOREIGN PATENT DOCUMENTS

| | | |
|---|---|---|
| EP | 0 413 867 | 2/1991 |
| EP | 0 494 504 | 7/1992 |
| EP | 0 955 682 | 11/1999 |
| JP | 09-171809 | 6/1997 |
| JP | 09171809 A | * 6/1997 |
| JP | 10-162792 | 6/1998 |

(Continued)

OTHER PUBLICATIONS

Japanese laid-open patent publication No. P2000-133240 A (May 12, 2000).

(Continued)

*Primary Examiner*—Keith Walker
(74) *Attorney, Agent, or Firm*—Kratz, Quintos & Hanson, LLP

(57) ABSTRACT

A closed battery, according to the invention, comprises a substantially flat box-type outer case 60 having electrical conductivity, provided with an opening on one side in the longitudinal direction thereof and other peripheral sides that are closed, a spiral electrode body 21 housed in the outer case, comprising a positive electrode, a negative electrode, and a separator interposed therebetween, an electrode current collector tab 21*a* larger in thickness than a core body, welded to a cut and raised piece that is cut and raised from an exposed part of the core body of one of the electrodes of the spiral electrode body, and a sealing plate 50 for covering and sealing the opening of the outer case, wherein the outer case is sealed by laser-welding with the electrode current collector tab being clamped between the rim of the opening and the sealing plate when sealing the opening of the outer case.

Under the construction described above, since the mechanical strength of the electrode current collector tab is enhanced, improvements in the performance and reliability of the closed battery can be obtained.

7 Claims, 3 Drawing Sheets

FOREIGN PATENT DOCUMENTS

| | | | |
|---|---|---|---|
| JP | 2000133240 A | * | 5/2000 |
| JP | 2002-56837 | | 2/2002 |

OTHER PUBLICATIONS

Japanese laid-open patent publication No. P2000-200595 A (Jul. 18, 2000).

Japanese laid-open patent publication No. P2001-325937 A (Nov. 22, 2001).

Japanese laid-open patent publication No. H11-329397 (Nov. 30, 1999).

* cited by examiner

# ELECTRODE TAB FOR SPIRAL WOUND BATTERY

FIELD OF THE INVENTION

The present invention relates to a closed battery, and more particularly, to improvements of a closed battery such as, for example, a closed battery rectangular in shape, provided with an electrode current collector tab maintaining such strength as would not allow easy breakage thereof, even when the battery is inadvertently dropped to the floor, and so forth.

BACKGROUND OF THE INVENTION

There has been widespread use of closed batteries in cylindrical or button-like shape as a power source of miniature electronic equipment, but there has been an increasing tendency in recent years towards mounting a closed battery in rectangular shape, which is deemed excellent in maximizing the use of space as compared with those closed batteries earlier described above, in various electronic equipment.

The closed batteries in rectangular shape include one fabricated by housing a spiral electrode in an outer case in the shape of a flat bottomed rectangle, having an opening on one side in the longitudinal direction thereof, and subsequently covering the opening with a sealing plate, thereby sealing the outer case by laser-welding the sealing plate to the outer case. In JP, H 10-162792, A, and JP, H 09-171809, A, a method of sealing the outer case has been disclosed whereby an electrode current collector tab is clamped between the rim of the opening and the sealing plate when welding the sealing plate to the opening such that the sealing plate is laser-welded to the rim of the opening and concurrently, the electrode current collector tab as well is welded to the outer case, thereby effecting electrical connection thereof with the outer case.

FIG. 3 is a perspective view showing the essential parts of a closed battery disclosed in JP, H 10-162792, A, in which a spiral electrode body 1 comprising a positive electrode, a negative electrode, and a separator interposed therebetween is housed in an outer case 2 of the battery, made of aluminum, doubling as a positive electrode outer terminal, and subsequently, a sealing plate 3 is laser-welded to the rim of the opening of the outer case 2.

A positive electrode current collector tab 4, leading from the exposed part of the core body of the positive electrode is clamped between the rim face of the sealing plate 3 and the opening of the outer case 2 at the time of the laser-welding, such that the sealing plate 3 is laser-welded to the outer case 2, thereby sealing the opening of the outer case 2, and at the same time, the positive electrode current collector tab 4 as well is welded to the outer case 2 to implement electrical connection therebetween. An incised part of a shape substantially resembling the letter U is formed at the winding end of the exposed part of the core body of the positive electrode, and a slender piece of foil, cut and raised from the incised part, is used as the positive electrode current collector tab 4.

Further, a negative electrode current collector tab 11 is separately extended from the spiral electrode body 1, and is electrically connected with a current collector terminal plate 13 while an adhesive tape (not shown) is attached to the winding end portion of the spiral electrode body 1 so as to maintain the spiral electrode body 1 in its current state. An adhesive tape 12 is adhered to the positive electrode current collector tab 4 so as to securely hold the latter.

However, since the positive electrode current collector tab 4 is made of a slender piece of foil, cut and raised from a portion of the exposed part of the core body of the positive electrode, the characteristics of the foil piece, such as mechanical strength, and so forth, are dependent on the material characteristics of the core body of the positive electrode. Because a piece of aluminum foil about 15 μm thick is normally used for the exposed part of the core body of the positive electrode, the positive electrode current collector tab, cut and raised from the aluminum foil, consists of an extremely thin and slender piece of foil, so that the mechanical strength thereof is rendered extremely low.

The above-described method of sealing the opening of the outer case results in the breakage of the positive electrode current collector tab when press-fitting the sealing plate into the opening in the case where, for example, the fit between the sealing plate and the outer case of the battery is tight, or when the battery as fabricated is inadvertently dropped to the floor, or when strong vibration, etc. is applied to the battery, and so forth, such that the positive electrode current collector tab is broken, thus resulting in electrical contact continuity based only on the contact condition between the outer case of the battery and the exposed part of the core body of the positive electrode. Accordingly, therefore, problems have arisen in that such electrical contact continuity is very unstable because of changes in internal resistance arising from change in contact pressure between the exposed part of the core body of the positive electrode and the inner face of the outer case, and in addition, the internal resistance of the battery increases.

SUMMARY OF THE INVENTION

The present invention has been developed in order to eliminate the problems posed by the conventional technology, and the object of the invention is to provide a closed battery with improved performance and reliability by preventing or aborting the breakage of the electrode current collector tab.

The above-described object of the invention can be achieved by adoption of the following construction. That is, a closed battery according to the invention comprises an outer case made of an electrically conductive material, having an opening on one side thereof, a spiral electrode body housed in the outer case, comprising a positive electrode, a negative electrode, and a separator interposed therebetween, a sealing plate for covering the opening of the outer case, and an electric current collector tab electrically connected with one of the electrodes, welded to the sealing plate and the opening of the outer case, wherein the electric current collector tab electrically connected with one of the electrodes is piece of foil electrically connected with a cut and raised piece that is cut and raised from the exposed part of the core body of one of the electrodes, and having a strength greater than that of the core body.

Bearing these features, a piece of foil having a strength greater than that of the core body, made of a constituent material of the same quality as that of the constituent material for the core body may be used, the foil piece preferably being greater in thickness than the core body. Further, if the foil piece is stronger than the core body, a piece of foil made of a constituent material of quality different from that of the constituent material for the core body may be used.

Under the construction described above, when the sealing plate is welded to the rim of the opening with laser, and so forth, the electrode current collector tab as well is welded to the outer case as to be electrically connected with the outer case. Furthermore, since the electrode current collector tab is made of a piece of foil piece having a strength greater than that of a portion of the core body, cut and raised from the exposed part of the core body of one of the electrodes of the spiral electrode body, the closed battery according to the present invention would be mechanically stronger than the conventional one with the electrode current collector tab forming a portion of the core body itself.

DESCRIPTION OF THE PREFERRED EMBODIMENT

Figure 1:
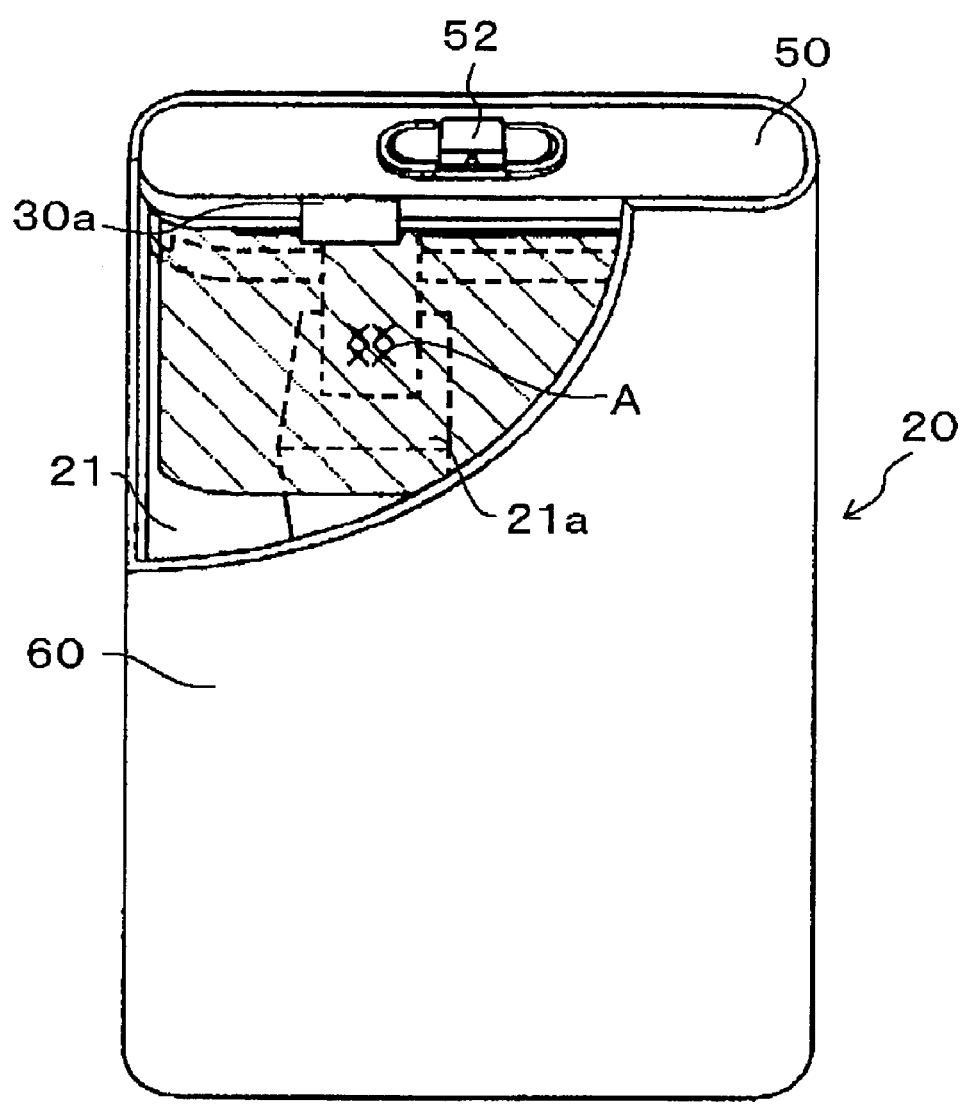
FIG. 1 is a perspective view showing the essential parts of the embodiment of a closed battery according to the present invention, fabricated by a fabrication method of the invention.
Figure 2:
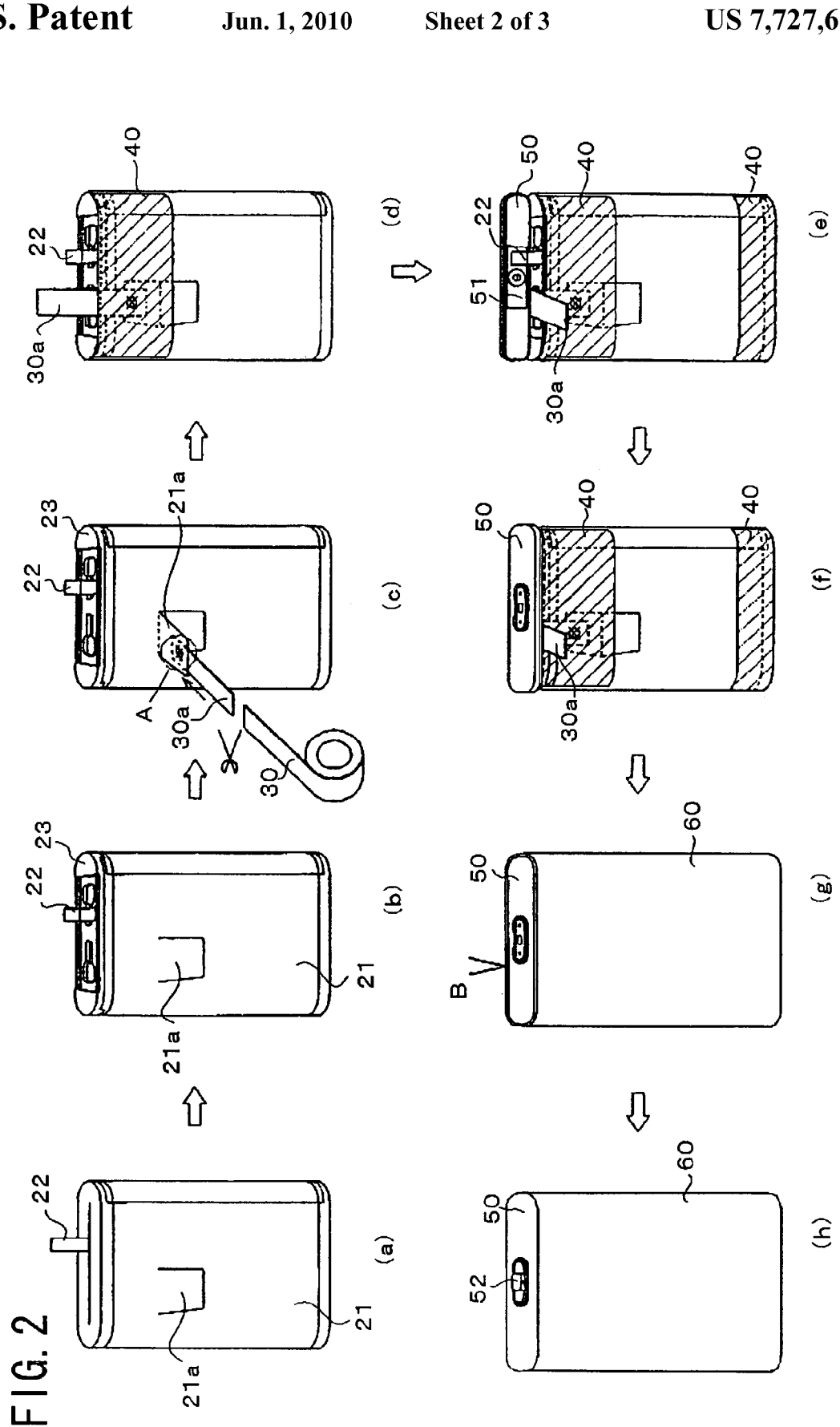
FIG. 2 is a schematic illustration showing the steps of fabricating a closed battery according to the embodiment of the invention.
Figure 3:
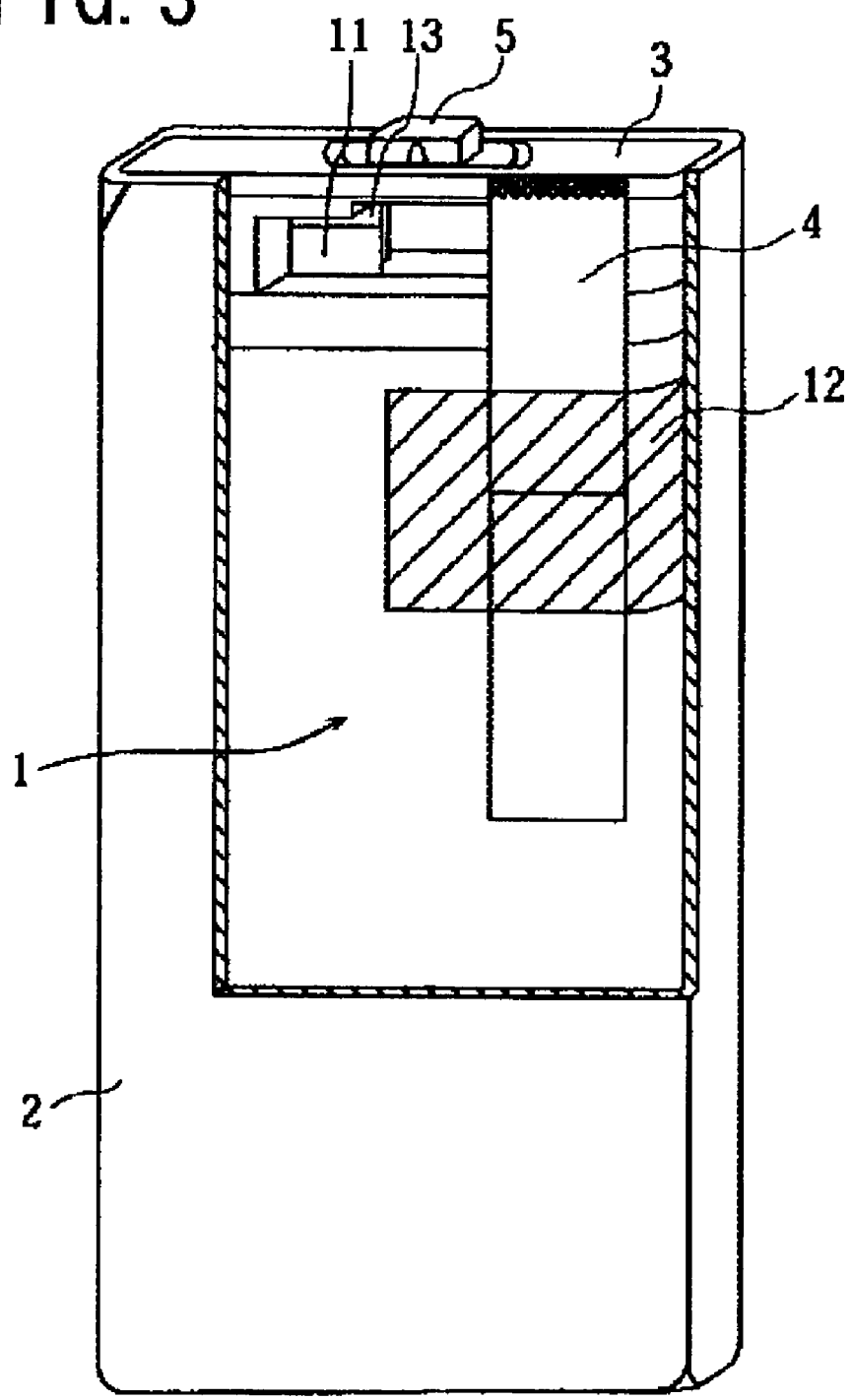
FIG. 3 is a perspective view showing the essential parts of a closed battery, fabricated by the conventional fabrication method.

The embodiment of the invention is described hereinafter with reference to FIG. 1 and FIG. 2. Referring now to FIG. 1, a closed battery 20, according to the embodiment of the invention, comprises a substantially flat box-like outer case 60 having electrical conductivity, provided with an opening on one side in the longitudinal direction thereof and other peripheral sides that are closed, a spiral electrode body 21 housed in the outer case 60, a positive electrode current collector tab 30a electrically connected with a cut and raised piece 21a that is cut and raised from the exposed part of the core body of one of electrodes of the spiral electrode body 21 through the method of, for example, welding etc., having a strength greater than that of the core body, and a sealing plate 50 for sealing the outer case 60 by covering the opening thereof. The outer case 60 is sealed with the positive electrode current collector tab 30a being clamped between the rim of the opening and the sealing plate 50 when sealing the opening of the outer case 60.

Under the construction described above, when the sealing plate 50 is laser-welded to the rim of the opening, the positive electrode current collector tab 30a as well is welded to the outer case 60 as to be electrically connected with the outer case 60. Furthermore, since the positive electrode current collector tab 30a is composed of a piece of foil having a strength greater than that of the core body of one of the electrodes, the mechanical strength of the positive electrode current collector tab 30a is rendered greater than that of the conventional one composed of the cut and raised piece of the core body itself.

The method of fabricating the closed battery is described hereinafter with reference to FIG. 2.

The spiral electrode body comprises a positive electrode, a negative electrode, and a separator interposed between both electrodes. The method of fabricating these electrode plates is already publicly known. In carrying out the invention, a suitable spiral electrode body fabricated by the publicly known method may be used. The following method shows an example thereof.

The positive electrode is fabricated by adding poly vinylidene fluoride (PVdF), dissolved in N-methyl-2-pyrrolidone, in terms of PVdF (a solid portion) amounting to 5 parts by weight, to a positive electrode composition composed of 85 parts by weight of $LiCoO_2$, 5 parts by weight of synthetic graphite powders, and 5 parts by weight of carbon black, preparing a positive electrode slurry by stirring and mixing a mixture, subsequently forming a positive electrode activated material layer by applying the positive electrode slurry to a positive electrode core body comprising an aluminum foil (thickness: 15 μm), thereafter, drying the positive electrode activated material layer, and rolling the same with a roller press before further vacuum drying the same at 110° C. for 3 hours.

The positive electrode has a both-face exposed part without the positive electrode activated material layer provided on both faces of the positive electrode core body within only a given distance from the winding end of the positive electrode core body, and also has a single-face exposed part with the positive electrode activated material layer provided on only one face of the positive electrode core body within only a given distance farther from the both-face exposed part, thereby exposing the positive electrode core body on the other face thereof. Further, an incised part of a shape substantially resembling the letter U, penetrating through the positive electrode core body, is formed in the both-face exposed part. The incised part is intended to form a foil piece to be connected with the positive electrode current collector tab, and is formed by incising the positive electrode core body with a sharp blade.

The negative electrode is fabricated by adding PVdF dissolved in N-methyl-2-pyrrolidone, in terms of PVdF amounting to 5 parts by weight, to 95 parts by weight of natural graphite powders of grain size in a range of 5 to 25 μm (a negative electrode composition), preparing a negative electrode slurry by stirring and mixing a mixture, subsequently forming a negative electrode activated material layer by applying the negative electrode slurry to both faces of a negative electrode core body, made of copper foil (thickness: 10 μm), thereafter drying the negative electrode activated material layer once, then subsequently rolling the same with a roller press, peeling off a portion of the activated material layer within the vicinity of the end of an electrode plate where winding starts, and spot welding a lead (a negative electrode current collector tab 22), made of nickel, to the portion of the activated material layer before further vacuum drying the activated material layer at 110° C. for 3 hours.

To form an electrolyte, a nonaqueous electrolyte is used and dissolved in a mixed solvent composed of ethylene carbonate and diethyl carbonate at a ratio by volume of 40:60 such that $LiPF_6$ is rendered in concentration of 1 mol/l.

The closed battery according to the present invention is fabricated by the following steps of fabrication with the use of the above-described electrodes, and so forth.

Referring to FIGS. 2(A) through 2(H), a spiral electrode body 21 in flat-plate shape is first fabricated by winding the positive electrode and the negative electrode with the separator, made of polyethylene, interposed therebetween, as shown in FIG. 2(A). The spiral electrode body 21 is wound about such that the single-face exposed part of the positive electrode faces the peripheral side of the spiral electrode body 21, and the both-face exposed part thereof is positioned in the outermost boundary region of the spiral electrode body 21.

Further, the incised part of a shape substantially resembling the letter U, penetrating through the both-face exposed part, is designed in the both-face exposed part. The incised part is intended for forming a cut and raised piece 21a to be connected with the positive electrode current collector tab, and is created by cutting the positive electrode core body with a sharp blade. The negative electrode current collector tab 22 is caused to protrude from the upper part of the spiral electrode body 21.

Then, as shown in FIG. 2(B), a spacer 23 made of an insulating material is mounted on the upper side face of the spiral electrode body 21, and the negative electrode current collector tab 22 is inserted through a part of the spacer 23 so as to cause a portion thereof to protrude. Further, as shown in FIG. 2(C), the cut and raised piece 21a is cut and raised by about 90°, from the incised part, ultrasonic welding being applied to the cut and raised piece 21a with the use of an aluminum foil hoop 30 with a given thickness, and after ensuring electrical connection therebetween, the aluminum foil hoop 30 is cut to a predetermined length using a cutting tool, thereby constituting the positive electrode current collector tab 30a.

Further, as shown in FIG. 2(D), the cut and raised piece 21a and the positive electrode current collector tab 30a welded thereto are further raised by about another 90°, and subsequently, an insulating tape 40 is stuck to, and securely attached to the spiral electrode body 21 in such a way as to cover up the cut and raised piece 21a and an ultrasonically welded part A. Furthermore, an insulating tape 40 is adhered and securely attached to the lower end as well of the spiral electrode body 21 as may be deemed necessary.

Thereafter, as shown in FIG. 2(E), the sealing plate 50 is positioned on the top side of the spiral electrode body 21, while a current collector terminal plate 51 is securely attached to the sealing plate 50 which in turn is electrically connected with the negative electrode current collector tab 22, and a part of the tip of the positive electrode current collector tab 30a is caused to protrude outside when the sealing plate 50 is brought into intimate contact with the spiral electrode body 21 (refer to FIG. 2(F)).

Subsequently, as shown in FIG. 2(G), the spiral electrode body 21 with the negative electrode current collector tab 22 electrically connected therewith is housed in an outer case 60 of the battery, and thereafter, the positive electrode current collector tab 30a leading from the positive electrode is extended along the inner wall of the outer case 60 of the battery up to the rim of the opening of the outer case 60. Then, the sealing plate 50 is fitted to the rim of the opening of the outer case 60 of the battery in such a way as to pinch the end of the positive electrode current collector tab 30a with the rim face of the sealing plate 50. Thereafter, while a predetermined external pressure is applied to the rim of the opening of the outer case 60 of the battery, the region where the sealing plate 50 is fitted to the outer case 60 of the battery is irradiated with a laser beam B, thereby welding the region. As a result of such laser welding, the opening of the outer case 60 is sealed, and the positive electrode current collector tab 30a is concurrently electrically connected to the outer case 60.

After the laser welding is applied as shown in FIG. 2(H), the nonaqueous electrolyte previously described is injected into the outer case 60 via a through-hole of the sealing plate 50, and the outer case 60 is closed by putting a battery cap 52 on top of the through-hole, thereby completing the closed battery.

Under the embodiment of the present invention, use is made of the closed battery in rectangular shape, however, the invention is not limited thereto, and is applicable to a closed battery in cylindrical shape as well. Further, the invention is not limited to the use of the outer case of the battery made of aluminum, as one made of aluminum alloy or stainless steel can be used instead. In addition, the invention is not limited to the battery using the nonaqueous electrolyte, but is also applicable to a nickel-hydrogen battery etc., using an aqueous electrolyte.

Further, the length of the positive electrode current collector tab may be increased as may be deemed necessary to enable a portion thereof to be folded up and housed in the outer case. By so doing, even if the battery is accidentally dropped and so forth, the impact of the accident can be absorbed by the folded up portion, thereby reducing the risk of occurrence of a degradation phenomenon such as breakage of the positive electrode current collector tab.

A constituent material of the same quality used for the positive electrode core body was likewise used for the positive electrode current collector tab, and a variety of closed batteries were fabricated by varying the thickness of the positive electrode current collector tab to examine the incidence of defects with respect to the respective closed batteries. Test results are given hereinafter.

Example 1

In the case of a closed battery according to Example 1, the closed battery was fabricated by the method of fabrication, as described in the present embodiment, using a hoop made of an aluminum foil 20 μm thick.

Example 2

In the case of a closed battery according to Example 2, the closed battery was fabricated by the same method of fabrication as that for Example 1, using a hoop made of an aluminum foil 25 μm thick.

Example 3

In the case of a closed battery according to Example 3, the closed battery was fabricated by the same method of fabrication as that for Example 1, using a hoop made of an aluminum foil 30 μm thick.

Comparative Example

In the closed battery according to the Comparative Example, a positive electrode current collector tab is formed by cutting and raising a portion of the exposed part of the core body of a spiral electrode body.

Test 1

A drop test was conducted on the respective closed batteries in accordance with Examples 1, 2, 3, and the Comparative Example under the following conditions. The results of the tests are summed up as shown in Table 1.

The tests were conducted under the condition that the respective closed batteries being in a discharging state were dropped on a concrete floor from a height of 1.65 m with different sides (6 sides in all) thereof facing the floor, respectively, at each time of dropping, which is hereinafter referred to as one cycle.

The number of batteries subjected to the tests in accordance with Examples 1, 2, 3, and the Comparative Example, was 20, including the defective batteries.

At the point where the internal resistance of the respective batteries increased to +15 mΩ or higher, variation in internal resistance was assumed to be faulty. The number of dropping cycles was 10 cycles at the maximum. Determination of whether the respective batteries were defective was made by disassembling the respective batteries and checking whether the positive electrode current collector tab was broken.

TABLE 1

|  | foil thickness | Number of defects | cycles of defect occurrence |
| --- | --- | --- | --- |
| Example 1 | 20 μm | 3 to 20 pcs. | in 6 to 8 cycles |
| Example 2 | 25 μm | 0 to 20 pcs. | in 10 or more cycles |

TABLE 1-continued

| | foil thickness | Number of defects | cycles of defect occurrence |
|---|---|---|---|
| Example 3 | 30 μm | 0 to 20 pcs. | in 10 or more cycles |
| Comp. Example | 15 μm | 16 to 20 pcs. | in 1 to 3 cycles |

As is evident from Table 1, in the case of the closed battery tested according to Examples 1, 2, 3, respectively, dramatic reduction in the incidence of defects during the drop tests was found as compared to the case of the closed battery according to the Comparative Example.

Thus, since the strength of the positive electrode current collector tab is increased by using foil that is thicker than the core body as a constituent material for the positive electrode current collector tab, it is possible to reduce the risk of occurrence of the degradation phenomenon such as breakage of the positive electrode current collector tab in case of accidents such as dropping of the battery, and so forth. Further, the positive electrode current collector tab which is at least 20 μm thick has an advantageous effect, although use of the positive electrode current collector tab which is at least 25 μm thick is preferable.

Furthermore, with respect to Examples 1, 2, and 3, the incidence of defective batteries in which a positive electrode current collector tab made of aluminum of the same quality as that used for the positive electrode core body was determined by varying the thickness of the positive electrode current collector tab, and test results showed that a positive electrode current collector tab made of an aluminum alloy having a strength greater than that of aluminum, and adaptable to the constituent material of an outer case can also be used. In such a case, even if the positive electrode current collector tab and the positive electric core body are of the same thickness, the strength of the former can be rendered higher than that of the latter. In this case as well, it will be evident that the advantageous effect of tendencies similar to those described with reference to Examples 1, 2, and 3 is attainable.

As described hereinbefore, the embodiment of the closed battery according to the present invention is such that the mechanical strength of the positive electrode current collector tab is enhanced, the breakage of the positive electrode current collector tab can be prevented or aborted even if the battery is inadvertently dropped to the floor, and so forth, such that the battery can exhibit excellent improvement in performance and reliability.

What is claimed is:

1. A closed battery comprising:
   an outer case made of an electrically conductive material, having an opening on one side thereof;
   a spiral electrode body housed in the outer case, comprising a positive electrode formed of an electrode foil coated on its face with a positive electrode activated material layer, a negative electrode formed of an electrode foil coated on its face with a negative electrode activated material layer, and a separator interposed therebetween, wherein one of the electrode foils of either the positive electrode or the negative electrode is exposed and contacts with said outer case at the outermost boundary region of the spiral electrode body and said one of the electrode foils has a portion thereof cut and raised;
   a sealing plate for covering the opening of the outer case; and
   an electric current collector tab, separate from said one of the electrode foils, being electrically connected at one of its ends directly to the face of the cut and raised portion of said one of the electrode foils so as to extend in a length direction, said length direction extending along the face of said one of the electrode foils toward said outer case opening, said electric current collector tab extending in said length direction beyond edges of said cut and raised portion of said one of the electrode foils, and said electric current collector tab being pinched at the other end between the outer case at the opening and the sealing plate, and welded together with the outer case at the opening and the sealing plate, wherein
   a thickness of the electric current collector tab is greater than that of the cut and raised piece of said one of the electrode foils and,
   wherein the electric current collector tab has a thickness of at least 20 microns and not more than 30 microns, and a thickness of the electrode foil is less than that of the electric current collector tab.

2. A closed battery according to claim 1, wherein the electrode foil exposed at an outermost boundary region of the spiral electrode body, the electric current collector tab, and the outer case are of aluminum.

3. A closed battery according to claim 1, wherein the electric current collector tab and the cut and raised piece of the spiral electrode body are connected mutually by welding.

4. A closed battery according to claim 1, wherein the electric current collector tab and the cut and raised piece of the spiral electrode body are connected mutually by ultrasonic welding.

5. A closed battery according to claim 1, wherein the electric current collector tab and the cut and raised piece of the spiral electrode body are adhered to the spiral electrode body by an insulating tape.

6. A closed battery according to claim 1, wherein a dimension of the electric current collector tab in a width direction, perpendicular to the length direction, is less than a dimension of said cut and raised portion along the same direction.

7. A closed battery according to claim 6, wherein the mechanical strength of said electric current collector tab in the length direction is greater than that of said cut and raised portion along the same direction.

* * * * *